(12) United States Patent
Griffin, Jr.

(10) Patent No.: US 8,185,222 B2
(45) Date of Patent: May 22, 2012

(54) WIRELESS AUDIO ADAPTER

(75) Inventor: Paul P. Griffin, Jr., Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 910 days.

(21) Appl. No.: 12/236,654

(22) Filed: Sep. 24, 2008

(65) Prior Publication Data
US 2009/0082890 A1  Mar. 26, 2009

Related U.S. Application Data

(63) Continuation-in-part of application No. 11/779,862, filed on Jul. 18, 2007, which is a continuation-in-part of application No. 11/286,610, filed on Nov. 23, 2005, now Pat. No. 7,647,129.

(51) Int. Cl.
G06F 17/00 (2006.01)
(52) U.S. Cl. .......................................... 700/94
(58) Field of Classification Search ...................... 700/94
See application file for complete search history.

(56) References Cited

U.S. PATENT DOCUMENTS

2003/0053378 A1* 3/2003 Lovin et al. ..................... 369/7
2007/0142944 A1* 6/2007 Goldberg et al. ............... 700/94
2007/0293183 A1* 12/2007 Marlowe ........................ 455/345
2008/0068252 A1* 3/2008 Mehta et al. ................... 342/115
2008/0218409 A1* 9/2008 Moinzadeh et al. ...... 342/357.06
2008/0320156 A1* 12/2008 Chen et al. ..................... 709/230
2009/0075649 A1* 3/2009 Rolf ........................... 455/426.1
2009/0112338 A1* 4/2009 Ueda .............................. 700/94

* cited by examiner

Primary Examiner — Paul McCord
(74) Attorney, Agent, or Firm — Hornkohl Intellectual Property Law, PLLC; Jason L. Hornkohl

(57) ABSTRACT

An adapter for receiving a wireless digital signal that includes an audio signal and audio metadata concerning the audio signal from a portable electronic device has a Bluetooth wireless receiver for receiving the wireless digital signal from the portable electronic device in a Bluetooth digital format. A microprocessor having format conversion software converts the Bluetooth formatted audio signal in the wireless digital signal into a satellite radio formatted audio signal. Satellite metadata generating software generates satellite radio formatted metadata based upon the received Bluetooth formatted audio metadata. A switch electrically couples an output of the adapter to a satellite radio input of an audio system when the Bluetooth transceiver detects a Bluetooth transmission. The adapter provides the satellite radio formatted audio signal and metadata to the audio system such that the audio signal is reproduced by an audio output of the audio system and the metadata is displayed on a display of the audio system. The adapter can also include an FM modulator that produces a frequency modulated output based upon the received Bluetooth formatted audio signal and metadata.

17 Claims, 4 Drawing Sheets

WIRELESS AUDIO ADAPTER

CROSS-REFERENCES TO RELATED APPLICATIONS

The present application is a continuation-in-part of co-pending application Ser. No. 11/779,862 filed Jul. 18, 2007 which is a continuation-in-part of application Ser. No. 11/286,610 filed Nov. 23, 2005 now U.S. Pat. No. 7,647,129.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Bluetooth is a wireless protocol that facilitates data transmissions over short distances from fixed and/or mobile devices. The intent behind the development of Bluetooth was the creation of a single digital wireless protocol, capable of connecting multiple devices and overcoming issues arising from synchronization of these devices. Bluetooth provides a way to connect and exchange information between devices such as mobile phones, telephones, laptops, personal computers, printers, GPS receivers, digital cameras, and video game consoles over a secure, global 2.4 GHz short-range radio frequency bandwidth. The Bluetooth specifications are developed and licensed by the Bluetooth Special Interest Group (SIG). The Bluetooth SIG consists of companies in the areas of telecommunication, computing, networking, and consumer electronics.

Bluetooth exists in many products, such as telephones, printers, modems and headsets. The technology is particularly useful when transferring information between two or more devices that are near each other in low-bandwidth situations. Bluetooth is commonly used to transfer sound data with telephones or byte data with hand-held computers. Bluetooth simplifies the discovery and setup of services between devices. Bluetooth devices can advertise all of the services they provide. This makes using services easier because there is no longer a need to set up network addresses or permissions as in many other networks.

Satellite radio services are provided through a digital radio signal that is broadcast by a communications satellite. Satellite radio uses the 2.3 GHz S band in North America and generally shares the 1.4 GHz L band with local Digital Audio Broadcasting (DAB) stations elsewhere. It is a type of direct broadcast satellite and is strong enough that it requires no satellite dish to receive. Each satellite receiver has an Electronic Serial Number (ESN) Radio ID that identifies the receiver. When a receiver unit is activated with a subscription, an authorization code is sent in the broadcast digital stream that instructs the receiver to allow access to the channels. Like other radio services, satellite radio also transmits program-associated data (PAD or metadata), like the artist and title of each song or program and possibly the name of the channel. Both services are available mainly via portable receivers in automobiles. Satellite radio receivers are typically built into an FM radio receiver, coupled to an existing FM receiver through an FM transmitter, or directly connected through a cable to an existing radio receiver.

In order to use Bluetooth, a device must be compatible with certain Bluetooth profiles. These define the possible applications and uses of the technology. Users of portable electronic devices such as digital music players and cellular telephone currently have no way to interface their Bluetooth devices with devices that do not have a Bluetooth transceiver. Since many other types of devices use entirely different protocols such as frequency modulation, satellite radio broadcasts or compact disc formats to format their data, many devices are not compatible with Bluetooth transmissions. While these devices can be equipped with Bluetooth transceivers, doing so increases the cost of the device and may only be desired by a small percentage of users. Therefore, unfortunately, there will always be devices that are not equipped to utilize the Bluetooth protocol.

BRIEF SUMMARY OF THE INVENTION

The present invention is embodied in an adapter for receiving a Bluetooth wireless digital signal that includes an audio signal and audio metadata concerning the audio signal from a portable electronic device. The adapter includes a Bluetooth wireless receiver for receiving the wireless digital signal from the portable electronic device in a Bluetooth digital format. A microprocessor having format conversion software converts the Bluetooth formatted audio signal in the wireless digital signal into a satellite radio formatted audio signal. The satellite radio data may be in an XM or Sirius satellite radio format. Satellite metadata generating software generates satellite radio formatted metadata based upon the received Bluetooth formatted audio metadata. The adapter provides the satellite radio formatted audio signal and metadata to the audio system such that the audio signal is reproduced by an audio output of the audio system and the metadata is displayed on a display of the audio system. The adapter may be connected in series between a satellite radio receiver and a car audio system. In such an embodiment, a switch electrically couples an output of the adapter to the satellite radio input of the audio system when the Bluetooth receiver detects a Bluetooth transmission. The adapter may have a housing configured to fit in the 12-volt car outlet and be powered through a connection to the automobile electrical system. The adapter can also include an FM modulator that produces a frequency modulated output based upon the received Bluetooth formatted audio signal and metadata and an FM transmitter for broadcasting the frequency modulated output to the audio system.

Another embodiment of the present invention is directed toward an accessory for receiving a wireless digital signal that includes an audio signal and audio metadata concerning the audio signal from a mobile phone. The accessory includes a wireless receiver for receiving the wireless digital signal from the mobile phone in a first digital format. A microprocessor having format conversion software converts the audio signal in the wireless digital signal from the first format into a radio receiver format. Metadata generating software generates radio receiver formatted metadata based upon the received audio metadata from the mobile phone. The radio receiver formatted data may be in a Bluetooth, FM, Satellite or compact disc format or text formatted to work with a CD input interface of the audio system head unit. The accessory provides the radio receiver formatted audio signal and metadata to the audio system such that the audio signal is reproduced by the radio receiver and the metadata is displayed on a display of the radio receiver. A switch electrically couples an output of the accessory to an input of the car radio receiver when the accessory detects a wireless transmission from the mobile phone. Verification software or hardware can verify the accessory or mobile phone is produced by an authorized vendor. If the radio receiver is a home radio system, the accessory preferably includes a wall plug and pair out audio outputs for coupling the radio receiver formatted audio signal and metadata to the home radio system. If the radio receiver is a car radio, the accessory preferably includes a housing configured to fit in a 12-volt car outlet and a power supply connection that receives power from the 12-volt car outlet.

The present invention can also be embodied in a method of transferring audio data and associated audio metadata from a portable electronic device to a radio receiver. The portable electronic device is preferably a mobile phone with a Bluetooth transceiver and the radio receiver is preferably a car satellite radio receiver. In accordance with the method, a wireless digital signal containing audio data and metadata relating to the audio data from the portable electronic device is detected and received. The received audio data and audio metadata is converted to a format capable of being received by the radio receiver. The converted audio data and metadata is coupled to the radio receiver such that an audio output is produced by the radio receiver based upon the audio data and the audio metadata is displayed on a display of the radio receiver. An external device is disconnected from a signal input of the radio receiver and the converted audio and metadata is coupled to the signal input when a wireless digital signal from the portable electronic device is detected.

DETAILED DESCRIPTION OF THE INVENTION

The present invention provides a novel manner of transferring an audio signal from a portable electronic device to an FM or satellite radio receiver. The invention is preferably implemented in a pass through device that is connected in series between a satellite radio receiver and an audio system. The device contains a receiver that receives Bluetooth formatted data from the portable device and converts the data into a satellite or FM formatted output. The device contains a signal override that disconnects the audio system from its normal satellite radio input signal or FM antenna when it detects a Bluetooth output and instead connects a satellite radio or FM formatted version of the wireless signal received from the portable electronic device to the audio system. The audio system interprets the received signal as a satellite radio signal and broadcast it. Data fields used to display satellite radio data are used to display metadata received from the portable electronic device.

Figure 1:
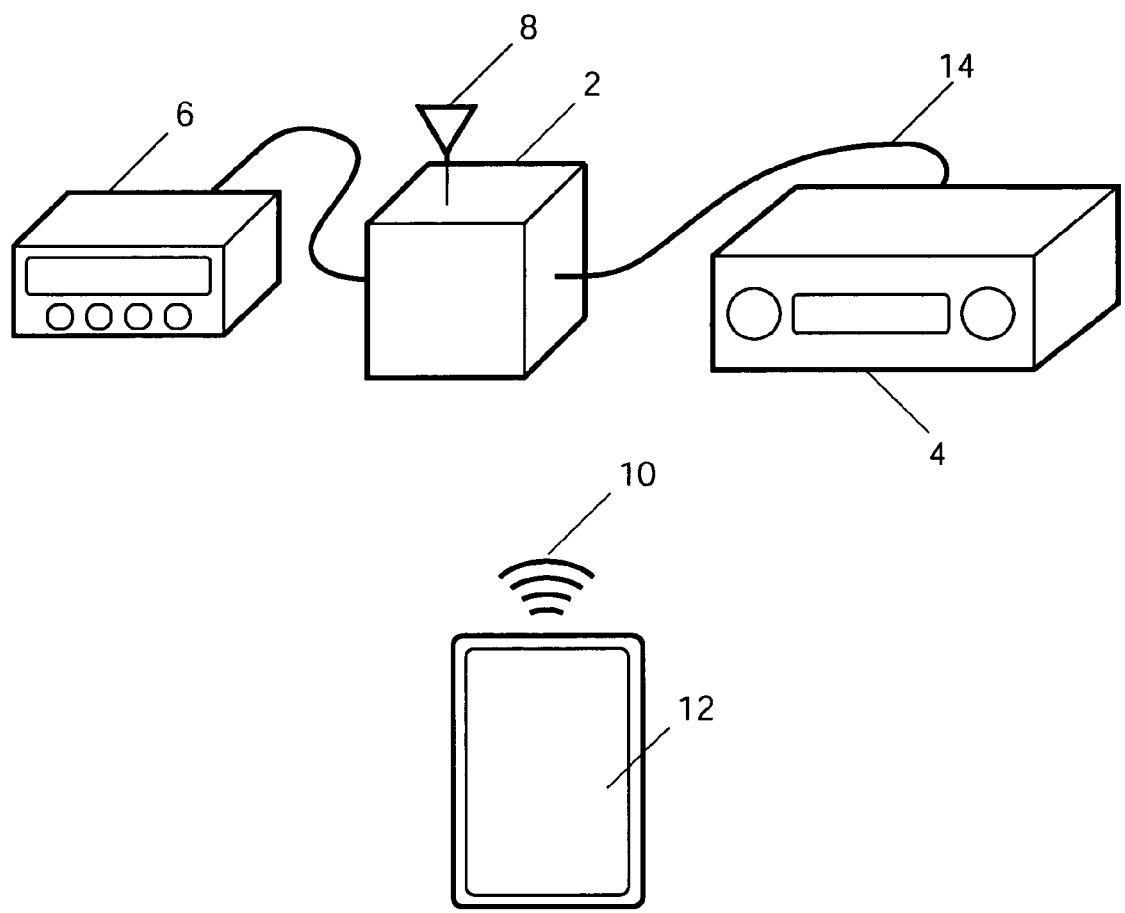
FIG. 1 is an illustration of an embodiment of the invention adapted to be connected between a satellite receiver and a car audio system.

Referring now to FIG. 1, an illustration of an embodiment of the present invention 2 is shown connected in series between a car stereo 4 and a satellite radio receiver 6. The conversion device 2 is preferably powered by the car's electrical system. The conversion device 2 includes an antenna 8 that receives a wireless Bluetooth formatted signal 10 from a portable electronic device 12, such as a mobile phone 12, having a wireless transmitter. When the conversion device 2 detects a Bluetooth signal 10 from the device 12 it disconnects the satellite radio receiver 6 from the car stereo 4. As discussed in more detail below, the device 2 uses internal processing circuitry to convert the Bluetooth formatted signal from the Bluetooth format to the satellite radio format. The device 2 then couples the satellite radio formatted signal to the satellite radio input 14 of the car radio 4. While Bluetooth and satellite format conversions are discussed for purposes of illustration, alternative format conversions can be implemented through the device 2.

Figure 2:
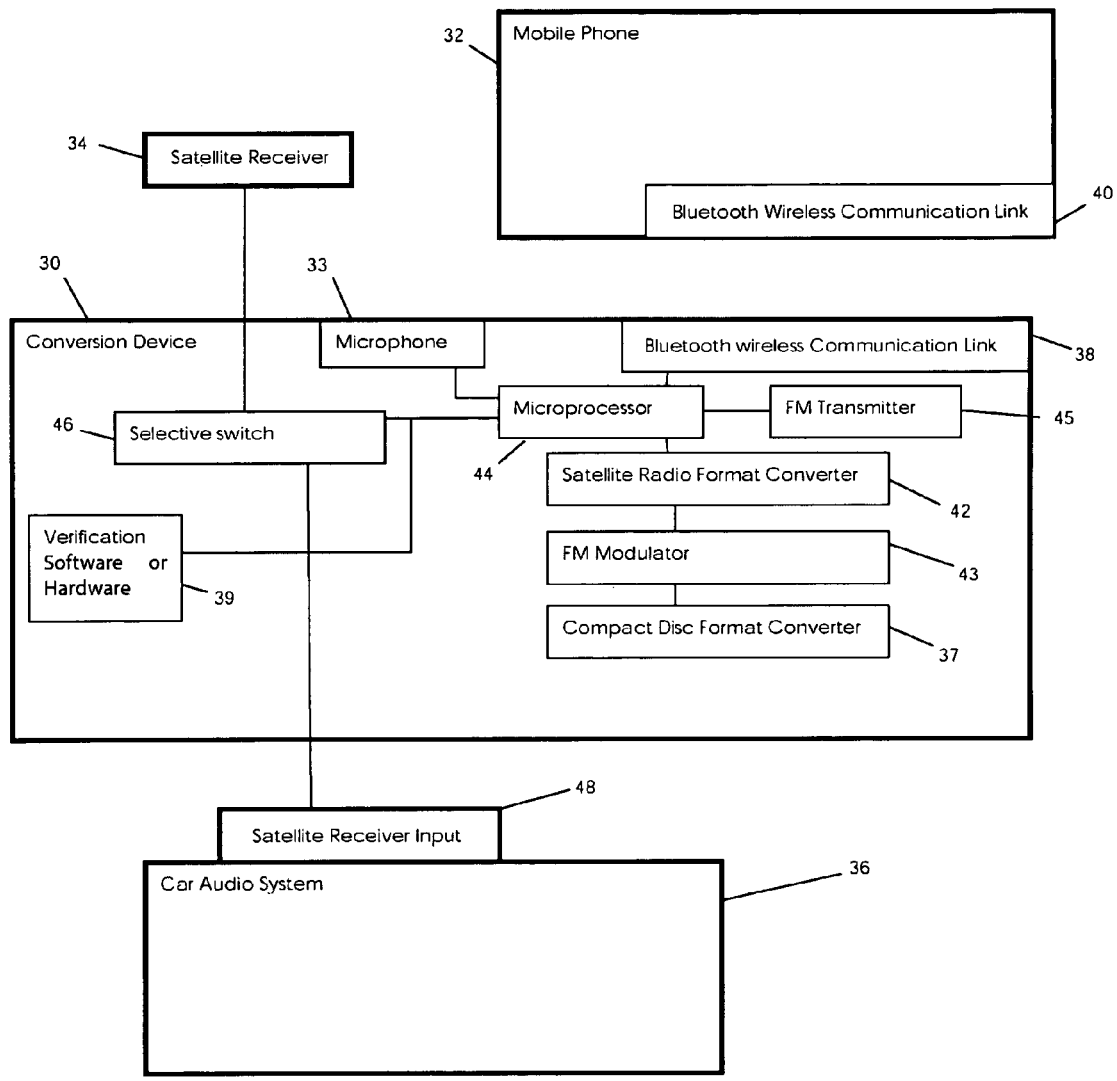
FIG. 2 is a block diagram of an embodiment of the present invention for use with a car audio system.

Referring now to FIG. 2, a block diagram of an embodiment of the present invention is shown. The conversion device 30 is connected in series between a satellite radio receiver 34 and a car audio system 36. The conversion device 30 receives a data signal transmitted from a Bluetooth wireless communication link 40 in a mobile phone 32 with a corresponding Bluetooth wireless communication link 38 in the conversion device. The conversion device 30 then converts the signal from the mobile phone 32 to a satellite radio format with a microprocessor 44 managed converter 42. A selective switch 46 controlled by the microprocessor 44 is used to selectively connect the satellite radio receiver 34 or the satellite formatted device signal from the mobile phone 32 to the satellite receiver input 48 of the car audio system 36.

The conversion device 30 also has an FM modulator 43 and FM transmitter 45 that can be used to convert the Bluetooth signal to a frequency modulated signal that can be coupled or broadcast to the car audio system 36. In addition, compact disc conversion software 37 can be used to convert the Bluetooth signal to a compact disc format for reception by a compact disc player input on the audio system.

The conversion device 30 can insert data received from the device 32 into the data fields available in the satellite format to cause the receiver to display data related to the signal from the portable electronic device 32 that is being broadcast by the audio system. For example, artist title and song information may be received from the mobile phone 32 through the Bluetooth link and reformatted and inserted into the satellite radio format data fields for the same data so that they are displayed by the audio system head unit 36. In addition, the data fields may be repurposed such that a playlist for digital music stored on the mobile phone 32 is inserted into the data fields typically used to display the satellite radio station.

Verification software or hardware 39 can be included in the conversion device 30 that verifies that the conversion device 30, mobile phone 32 or audio system 36 is produced by an authorized entity. The verification software or hardware 39 can be an identification resistor, software code or any other type of known verification system.

The system of FIG. 2 can operate such that a user can manage a phone call received through the mobile phone 32 over their car audio system 36. The conversion device 30 receives the audio data from the phone 32 through the Bluetooth wireless communication link 38t, produces a satellite radio formatted output and couples the formatted output to the car audio system 36 such that the call based audio is produced by the car audio system 36. The caller identification information for a call received by the phone 32 can be displayed on the display of the audio system 36 while the call is audio is broadcast over the audio systems speakers. A microphone 33, which may include noise canceling functionality, in the conversion device receives the user's voice responses to the call, the microprocessor 44 then converts the received audio into a Bluetooth format and transmits the data to the mobile phone 32 using the Bluetooth communication link 38. This allows the user to use their mobile phone 32 in a hands free manner while in their automobile.

Figure 3:
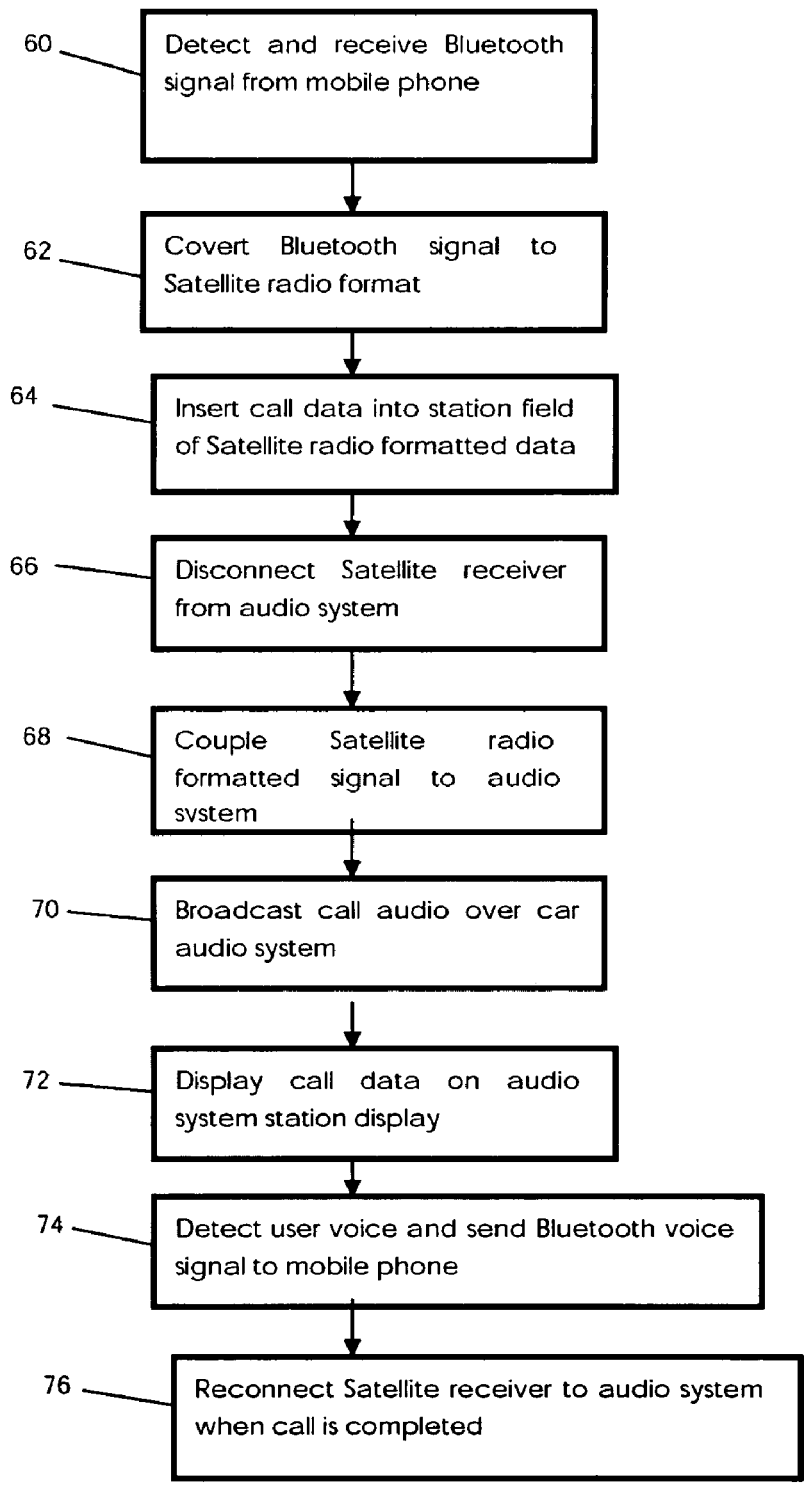
FIG. 3 is a flow chart of a method of managing a phone call over a car audio system in accordance with an embodiment of the present invention.

Referring now to FIG. 3, a method of managing a phone call over a car audio system in accordance with an embodiment of the present invention is shown. The method commences in block 60 with the detecting and receiving of a Bluetooth signal from a mobile phone. In block 62, the Bluetooth signal is converted to a satellite radio format. The call data received from the mobile phone is inserted into a metadata field, like the station field, of the satellite radio formatted data in block 64. The satellite receiver is disconnected from the car audio system in block 66 when a transmission from the mobile phone is detected. In block 68 the satellite radio formatted signal is coupled to the car's audio system. The call audio is then broadcast over the car audio system as shown in step 70. In addition, the call data is displayed on the car's audio system display while the call audio is being broadcast as shown in block 72. In block 74, the user's voice is detected and a Bluetooth voice signal generated based upon the detected voice is sent to the mobile phone. The method ends in block 76 with the reconnecting of the satellite receiver to the car's audio system when the call from the mobile phone is completed.

Figure 4:
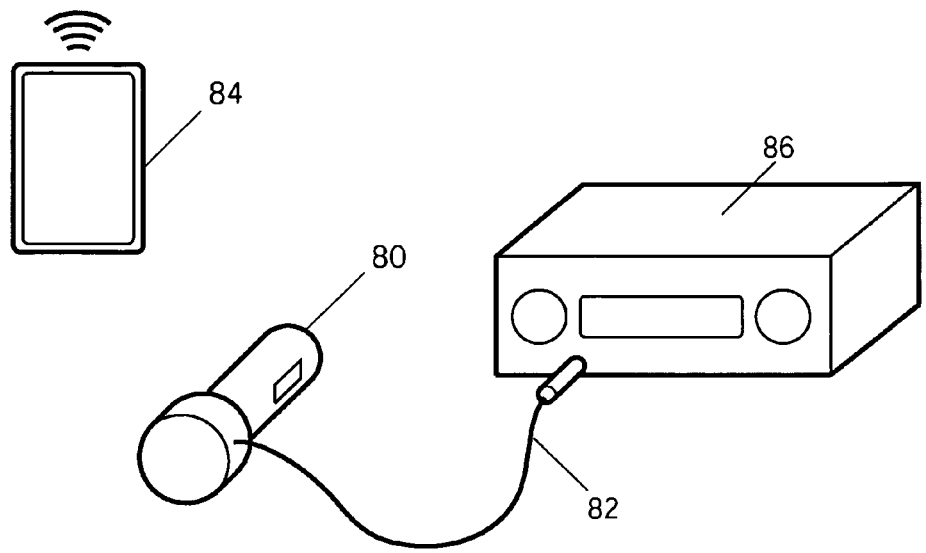
FIG. 4 is an illustration of an embodiment of the invention adapted for insertion in a 12-volt outlet and use with a car audio system.

Referring to FIG. 4, an illustration of an embodiment of the invention adapted for insertion in a 12-volt car outlet and use with a car audio system is shown. The format adapting accessory is contained within a housing 80 that is configured to fit in a 12-volt car outlet. The housing 80 receives a wireless signal from the mobile phone 84 and converts the received signal to the format required by the car stereo 86. An audio cable 82 is used to couple the formatted audio output from the housing 80 to the audio input of the car audio system 86. The housing 80 contains the electronics necessary to implement the invention as described above and receives power from the 12-volt car outlet.

Figure 5:
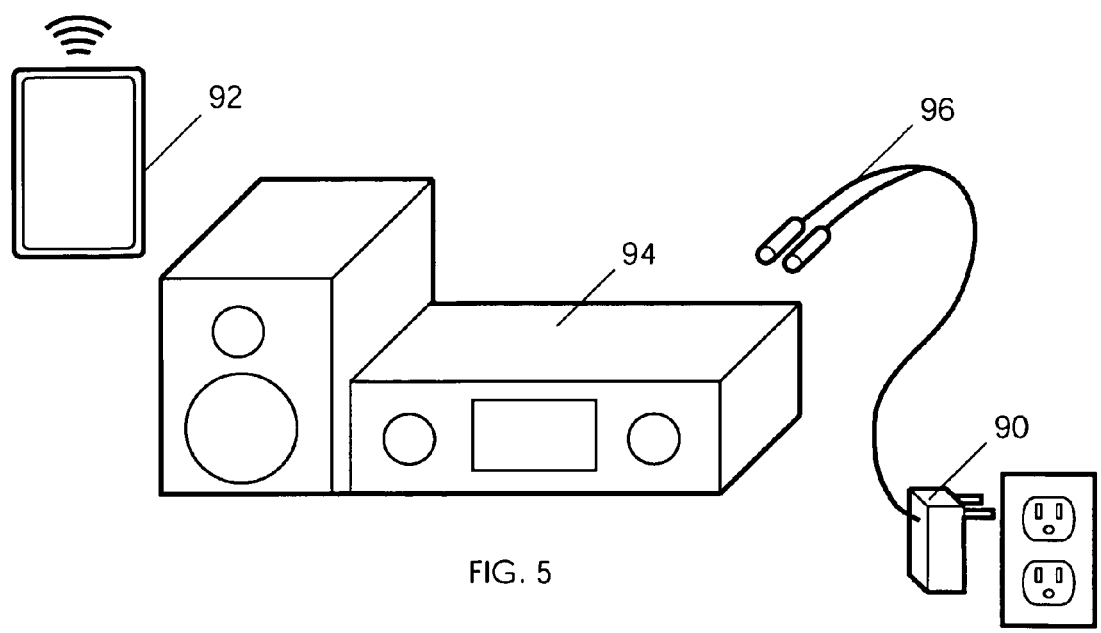
FIG. 5 is an illustration of an embodiment of the invention adapted for use with a home audio system.

FIG. 5 is an illustration of an embodiment of the invention adapted for use with a home audio system. The circuitry for the format converting accessory is contained within a housing 90 having a 120-volt outlet plug that is used to supply power to the internal circuitry. The housing 90 receives a wireless digital signal from the mobile phone 92 and converts the received wireless signal to the format required by the home audio system 94. A pair of audio output cables 96 is used to couple the converted signal to the home audio system 94.

Although there have been described particular embodiments of the present invention of a new and useful WIRELESS AUDIO ADAPTER, it is not intended that such references be construed as limitations upon the scope of this invention except as set forth in the following claims.

What is claimed is:

1. An adapter for receiving a wireless digital signal that includes an audio signal and audio metadata concerning said audio signal from a portable electronic device, said adapter comprising:
    a Bluetooth wireless receiver for receiving the wireless digital signal from the portable electronic device in a Bluetooth digital format;
    a microprocessor having format conversion software for converting the Bluetooth formatted audio signal in said wireless digital signal into an XM or Sirius satellite radio formatted audio signal;
    XM or Sirius satellite metadata generating software for generating satellite radio formatted metadata based upon said received Bluetooth formatted audio metadata;
    a switch for electrically coupling an output of said adapter to a satellite radio input of an audio system when said Bluetooth transceiver detects a Bluetooth transmission;
    wherein said adapter provides the satellite radio formatted audio signal and metadata to the audio system such that said audio signal is reproduced by an audio output of said audio system and said metadata is displayed on a display of said audio system.

2. The adapter of claim 1 further comprising an FM modulator that produces a frequency modulated output based upon the received Bluetooth formatted audio signal and metadata.

3. The adapter of claim 2 further comprising an FM transmitter for broadcasting the frequency modulated output.

4. The adapter of claim 1 wherein said adapter is connected in series between a satellite radio receiver and a car stereo.

5. The adapter of claim 4 wherein the adapter is powered through a connection to an automobile electrical system.

6. The adapter of claim 1 wherein said adapter has a housing configured to fit in a 12-volt car outlet.

7. An accessory for receiving a Bluetooth signal that includes an audio signal and audio metadata concerning said audio signal from a mobile phone, said accessory comprising:
    a wireless receiver for receiving the Bluetooth signal from the mobile phone in a first digital format;
    a microprocessor having format conversion software for converting the audio signal in said Bluetooth signal from said first format into an XM or Sirius satellite radio receiver formatted audio signal;
    XM or Sirius satellite metadata generating software for generating satellite radio receiver formatted metadata based upon said received audio metadata from the mobile phone;
    wherein said accessory provides the satellite radio receiver formatted audio signal and metadata to the audio system such that said audio signal is reproduced by the satellite radio receiver and said metadata is displayed on a display of said satellite radio receiver.

8. The accessory of claim 7 further comprising a switch for electrically coupling an output of said accessory to an input of a car radio receiver when the accessory detects a wireless transmission from the mobile phone.

9. The accessory of claim 7 further comprising verification software or hardware that verifies the accessory or mobile phone is authorized.

10. The accessory of claim 7 further comprising an FM modulator and FM transmitter for modulating said formatted audio signal and metadata to said radio receiver.

11. The accessory of claim 7 wherein said format conversion and metadata generating software converts said audio signal and metadata into compact disc format.

12. The accessory of claim 7 wherein the radio receiver is a home radio system further comprising a wall plug and a pair of audio outputs for coupling the radio receiver formatted audio signal and metadata to the home radio system.

13. The accessory of claim 10 wherein the radio receiver is a car radio further comprising a housing configured to fit in a 12-volt car outlet and a power supply connection for receiving power from the 12-volt car outlet.

14. A method of transferring audio data and associated audio metadata from a portable electronic device to an XM or Sirius satellite radio receiver, said method comprising the steps of:
    detecting and receiving a Bluetooth signal containing audio data and metadata relating to said audio data from the portable electronic device;

converting the received audio data and audio metadata to an XM or Sirius satellite format capable of being received by the radio receiver; and coupling the converted audio data and metadata to the radio receiver such that an audio output is produced by said radio receiver based upon the audio data and the audio metadata is displayed on a display of the radio receiver.

15. The method of claim 14 further comprising the step of disconnecting an external device from a signal input of the radio receiver and coupling the converted audio and metadata to the signal input when a wireless digital signal from the portable electronic device is detected.

16. The method of claim 14 wherein the portable electronic device is a mobile phone with a Bluetooth transceiver.

17. The method of claim 14 wherein said radio receiver is a car satellite radio receiver.

* * * * *